US010018072B2

(12) United States Patent
Virkler et al.

(10) Patent No.: US 10,018,072 B2
(45) Date of Patent: Jul. 10, 2018

(54) DUAL TRIP MANIFOLD ASSEMBLY FOR TURBINE SYSTEMS

(71) Applicant: General Electric Company, Schenectady, NY (US)

(72) Inventors: Adam Eric Virkler, Erie, CO (US); Daniel John Nosek, Glenville, NY (US); Troy Gilchrist Wojick, Broomfield, CO (US); Brent Allan Dietrich, Timnath, CO (US); Terry Joseph Bailey, Schenectady, NY (US)

( * ) Notice: Subject to any disclaimer, the term of this patent is extended or adjusted under 35 U.S.C. 154(b) by 4 days.

(21) Appl. No.: 15/276,406

(22) Filed: Sep. 26, 2016

(65) Prior Publication Data

US 2017/0342856 A1 Nov. 30, 2017

Related U.S. Application Data

(60) Provisional application No. 62/342,029, filed on May 26, 2016.

(51) Int. Cl.
| | |
|---|---|
| *F01D 21/02* | (2006.01) |
| *F16K 31/04* | (2006.01) |
| *F01D 21/16* | (2006.01) |
| *F01D 21/18* | (2006.01) |

(Continued)

(52) U.S. Cl.
CPC .............. *F01D 21/02* (2013.01); *F01D 21/14* (2013.01); *F01D 21/16* (2013.01); *F01D 21/18* (2013.01); *F01K 7/16* (2013.01); *F16K 31/041* (2013.01); *F16K 31/042* (2013.01); *F16K 31/043* (2013.01); *F16K 31/045* (2013.01); *F16K 31/047* (2013.01); *F16K 31/048* (2013.01); *F16K 35/14* (2013.01); *H02K 7/1823* (2013.01); *F05D 2220/30* (2013.01);
(Continued)

(58) Field of Classification Search
CPC .......... F01D 21/18; F01D 21/02; F01D 21/16; Y10T 137/87981; Y10T 137/88014; Y10T 137/87113; F16K 35/14; F16K 31/047; F16K 31/043; F16K 31/041; F16K 31/046; F16K 31/045; F16K 31/042; F16K 31/048

See application file for complete search history.

(56) References Cited

U.S. PATENT DOCUMENTS

| 3,928,975 A | 12/1975 | Braytenbah |
|---|---|---|
| 3,928,976 A | 12/1975 | Braytenbah et al. |

(Continued)

FOREIGN PATENT DOCUMENTS

| CN | 101074614 A | 11/2007 |
|---|---|---|
| JP | 2016125406 A | 7/2016 |

*Primary Examiner* — Atif Chaudry
(74) *Attorney, Agent, or Firm* — Mintz Levin Cohn Ferris Glovsky and Popeo, P.C.

(57) ABSTRACT

A dual trip manifold assembly (TMA) includes an isolation valve assembly having a first valve configured to receive a flow of fluid from a hydraulic system fluid supply. The first valve is configured to channel the flow of fluid to at least one hydraulic circuit. The isolation valve assembly also includes a second valve configured to receive the flow of fluid from the at least one hydraulic circuit. The second valve is further configured to channel the fluid flow to a trip header. The first valve and the second valve are synchronized to each other such that rotation of one valve causes a substantially similar rotation in the other valve.

11 Claims, 5 Drawing Sheets

(51) Int. Cl.
*F16K 35/14* (2006.01)
*F01D 21/14* (2006.01)
*F01K 7/16* (2006.01)
*H02K 7/18* (2006.01)

(52) U.S. Cl.
CPC .. *F05D 2220/76* (2013.01); *F05D 2260/4031* (2013.01); *F05D 2260/605* (2013.01); *F05D 2270/021* (2013.01); *F05D 2270/091* (2013.01); *Y10T 137/87113* (2015.04); *Y10T 137/87981* (2015.04); *Y10T 137/88014* (2015.04)

(56) References Cited

U.S. PATENT DOCUMENTS

| | | | |
|---|---|---|---|
| 3,928,977 A | 12/1975 | Braytenbah et al. | |
| 3,931,714 A | 1/1976 | Jaegtnes et al. | |
| 4,929,148 A * | 5/1990 | Nutter | F01D 21/00 415/32 |
| 5,035,262 A * | 7/1991 | Schweikert | B01F 15/0429 137/607 |
| 5,561,976 A | 10/1996 | Chu et al. | |
| 5,819,526 A * | 10/1998 | Jackson | B64G 1/402 219/121.51 |
| 6,488,260 B1 * | 12/2002 | Dietz | F16K 31/047 251/129.13 |
| 7,874,241 B2 | 1/2011 | Natili et al. | |
| 8,752,653 B2 * | 6/2014 | Seneviratne | E21B 21/106 137/613 |
| 2011/0240893 A1 * | 10/2011 | Windgassen | H02K 5/1675 251/129.13 |
| 2013/0233423 A1 * | 9/2013 | Dietrich | F01D 21/02 137/625.63 |
| 2013/0327408 A1 | 12/2013 | Jacobs et al. | |
| 2015/0247421 A1 | 9/2015 | Wojick et al. | |

* cited by examiner

DUAL TRIP MANIFOLD ASSEMBLY FOR TURBINE SYSTEMS

CROSS REFERENCE TO RELATED APPLICATIONS

This application claims priority to and the benefit of the filing date of U.S. Provisional Application No. 62/342,029 filed on May 26, 2016, which is hereby incorporated by reference in its entirety.

BACKGROUND

The subject matter described herein relates generally to turbine systems, and more particularly, to a dual trip manifold assembly for turbine systems.

At least some known turbine systems include emergency overspeed protection systems (EOPS) that facilitate shutting down the turbine system under certain operating conditions. Some known turbine and EOPS systems use a hydraulic system to initiate and control the shutdown of the turbine systems via a trip manifold assembly (TMA). However, some TMAs are susceptible to contamination that is present in turbine hydraulic control systems. This can result in reduced performance of the EOPS systems. In addition, maintenance and repair of the TMA during operation is limited due to the use of the TMA by the turbine systems. At least some turbine operators need an online-maintainable EOPS system that enables online maintenance and repair/replacement of the TMA.

BRIEF DESCRIPTION

In one aspect, a dual trip manifold assembly (TMA) is provided. The dual TMA includes an isolation valve assembly including a first valve configured to receive a flow of fluid from a hydraulic system fluid supply. The first valve is configured to channel the flow of fluid to at least one hydraulic circuit of at least two hydraulic circuits. The isolation valve assembly also includes a second valve configured to receive the flow of fluid from the at least one hydraulic circuit of the at least two hydraulic circuits. The second valve is further configured to channel the fluid flow to a trip header. The first valve and the second valve are synchronized to each other such that rotation of one of the first and second valves causes a substantially similar rotation in the other of the first and second valves.

In another aspect, an emergency overspeed protection system is provided. The emergency overspeed protection system includes at least one trip manifold assembly (TMA) including a fluid supply header and a trip header coupled in flow communication to the fluid supply header. The emergency overspeed protection system also includes an isolation valve assembly including a first valve configured to receive a flow of fluid from a hydraulic system fluid supply. The first valve is coupled in flow communication to the fluid supply header. The isolation valve assembly also includes a second valve coupled to the trip header. The second valve is configured to receive the flow of fluid from the trip header. The first valve and the second valve are coupled to each other such that closing the first valve with respect to at least one TMA causes the second valve to close with respect to the at least one TMA, thereby isolating at least one TMA from the flow of fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
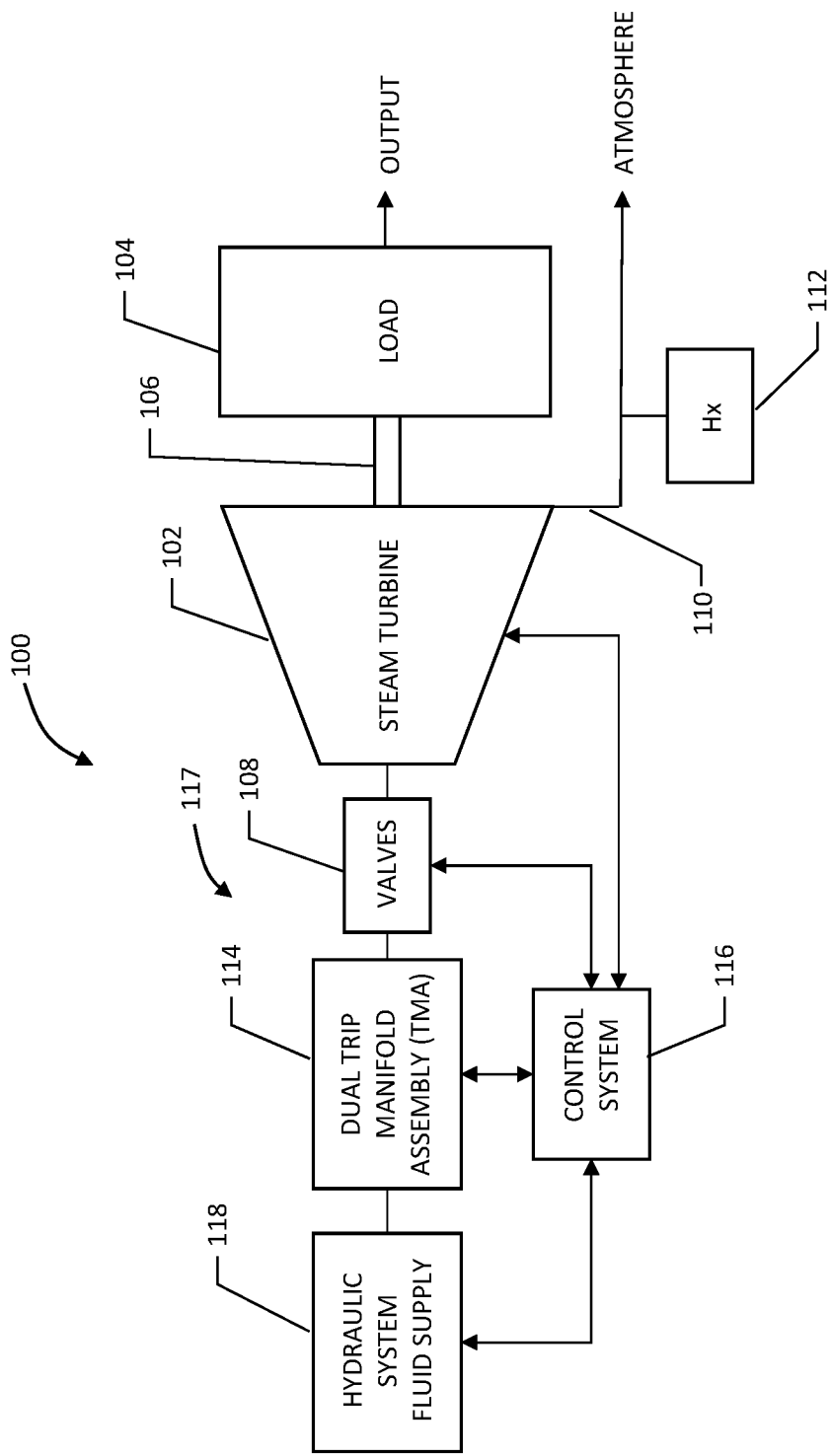
FIG. 1 is a schematic view of an exemplary steam turbine system.

Unless otherwise indicated, the drawings provided herein are meant to illustrate features of embodiments of the disclosure. These features are believed to be applicable in a wide variety of systems comprising at least one embodiment of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The present disclosure provides techniques for protecting turbine systems. In particular, the disclosure provides a modular turbine protection system having redundancy, increased reliability, and the ability to be tested and repaired while the turbine system is running. The turbine protection system includes two trip manifold assemblies connected together with an isolation valve assembly. As described more fully below, embodiments of the protection system relate to an isolation valve assembly that provides for removing from service, testing, repairing, and returning to service one of the two trip manifold assemblies without shutting down the turbine system. Other embodiments are within the scope of the disclosure.

More particularly, the present disclosure provides a modular dual trip manifold assembly (dual TMA) that is an improved contamination resistant, triple modular redundant (TMR), fault tolerant, online-testable, online-maintainable, electro-mechanical-hydraulic assembly that functions as an interface between a turbine control system and hydraulically-powered final control components (e.g., stop, control, intercept, and/or reheat stop valves) of the turbine control and an emergency shutdown system. The dual TMA includes two trip manifold assemblies coupled in a parallel configuration to the isolation valve assembly. Each TMA includes a TMR arrangement of isolation valves, pilot solenoid valves, hydraulic shutoff valves, instrumented depressurization (dump) valves, hydraulic relay valves, orifices, filters, and check valves. The dual TMA provides increased turbine tripping, running reliability, and contamination resistance. In addition, the dual TMA can be used in high pressure hydraulic control systems having for example, pressures up to about 3000 pounds per square inch (psig), and preferably, pressures at about 2400 psig. The dual TMA provides increased flow capacity, fast response, and high contamination tolerance to the contamination that is present in the turbine hydraulic control system. The isolation valve assembly provides for both sides of the dual TMA to be in operation for increased tripping reliability. In addition, the dual TMA provides for either side to be isolated from the system to perform online maintenance to the isolated TMA. The dual TMA also provides for pressurizing and testing the isolated TMA while the turbine system is online.

FIG. 1 is a schematic view of an exemplary steam turbine system 100. While FIG. 1 describes an exemplary steam turbine, it should be noted that the apparatus and systems described herein are not limited to any one particular type of turbine system. One of ordinary skill in the art will appreciate that the apparatus and systems described herein may be used with any rotary machine, including for example, a gas turbine engine, in any suitable configuration that enables such an apparatus and system to operate as further described herein.

In the exemplary embodiment, steam turbine system 100 is a single-flow steam turbine system. Alternatively, steam turbine system 100 is any type of steam turbine, for example, and without limitation, a low-pressure turbine, an opposed-flow, high-pressure and intermediate-pressure steam turbine combination, and a double-flow steam turbine engine. Moreover, as discussed above, the present disclosure is not limited to only being used in steam turbine systems and can be used in other turbine systems, such as gas turbine engines.

In the exemplary embodiment, steam turbine system 100 includes a steam turbine 102 coupled to a load 104 by a rotatable shaft 106. Steam turbine system 100 also includes one or more valves 108 coupled to steam turbine 102. Valves 108 control a fluid flow to steam turbine 102. Steam turbine 102 uses the fluid flow, for example, steam and/or fuel, to generate power used to turn rotatable shaft 106 and load 104. In one embodiment, load 104 is an electrical generator configured to generate electrical energy as it is rotated by the work extracted from the fluid flow to steam turbine 102. Alternatively, load 104 can be any type of driven load. In the exemplary embodiment, load 104 includes an output, for example, and without limitation, electrical energy. In the exemplary embodiment, steam turbine 102 exhausts an expanded fluid flow 110. Expanded fluid flow 110 is channeled to, for example, and without limitation, a heat exchanger 112 for extracting additional energy from expanded fluid flow 110, exhausted to atmosphere, or used for any other purpose that enables steam turbine system 100 to function as described herein.

In the exemplary embodiment, valves 108 include, for example, and without limitation, a plurality of valves that regulate the fluid intake of steam turbine 102. Valves 108 are coupled to a dual trip manifold assembly (dual TMA) 114 and are communicatively coupled to a control system 116 to form a portion of an emergency overspeed protection system (EOPS) 117. Valves 108 are actuated and/or positioned via control system 116 to facilitate fluid intake by steam turbine 102. Valves 108 include, for example, and without limitation, hydraulic powered stop valves and safety valves that are actuated or controlled by dual TMA 114 during an emergency shutdown, or trip of steam turbine 102. To facilitate actuating hydraulic powered valves 108, dual TMA 114 is coupled in fluid communication to a hydraulic system fluid supply 118. Hydraulic system fluid supply 118 operates to supply a pressurized hydraulic fluid to dual TMA 114 to operate dual TMA 114 for actuating valves 108 to shut down or trip steam turbine 102.

Figure 2:
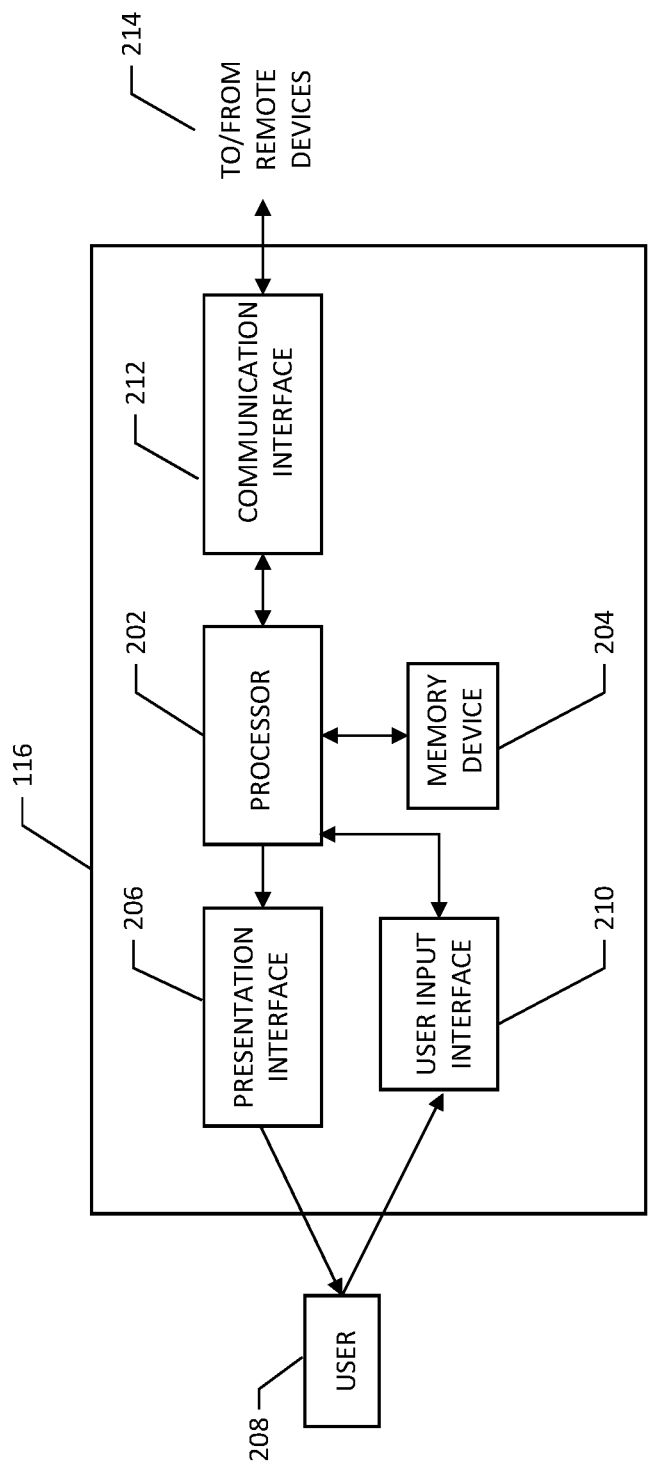
FIG. 2 is a block diagram of a control system for use with the steam turbine system shown in FIG. 1.

FIG. 2 is a block diagram of control system 116 for use with steam turbine 102 (shown in FIG. 1). Control system 116 generates and implements various control algorithms and techniques to control steam turbine 102, valves 108, dual TMA 114, and hydraulic system fluid supply 118. In the exemplary embodiment, control system 116 includes a processor 202 for executing instructions. In some embodiments, executable instructions are stored in a memory device 204. Processor 202 includes one or more processing units (e.g., in a multi-core configuration). Memory device 204 is any device allowing information such as executable instructions and/or other data to be stored and retrieved. Memory device 204 stores parameters for controlling the operation of steam turbine 102, as described in more detail herein. Memory device 204 includes one or more computer-readable media.

In the exemplary embodiment, control system 116 includes at least one presentation interface component 206 for presenting information to a user 208. Presentation interface 206 is any component capable of conveying information to user 208. In some embodiments, presentation interface 206 includes an output adapter such as a video adapter and/or an audio adapter. The output adapter is operatively coupled to processor 202 and operatively coupleable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In some embodiments, the output device is a remote device, and presentation interface 206 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In other embodiments, control system 116 does not include presentation interface 206.

Control system 116 includes a user input interface 210 for receiving input from user 208. User input interface 210 may include, for example, without limitation, one or more buttons, a keypad, a touch sensitive panel (e.g., a touch pad or a touch screen), and/or a microphone. A single component such as a touch screen may function as both an output device of presentation interface component 206 and user input interface 210. Some embodiments of control system 116 do not include user input interface 210.

In the exemplary embodiment, control system 116 includes a communication interface 212, which is communicatively coupleable to one or more remote devices 214, for example, and without limitation, valves and sensors. In some embodiments, communication interface 212 is configured to enable communication through a short range wireless communication protocol such as Bluetooth™ or Z-Wave™ through WiFi, and/or through a mobile phone (i.e., cellular) network (e.g., Global System for Mobile communications (GSM), 3G, 4G) or other mobile data network (e.g., WIMAX), or a wired connection (i.e., one or more conductors for transmitting electrical signals). In embodiments that communication interface 212 couples control system 116 to one or more valves, communication interface 212 may include, for example, one or more conductors for transmitting electrical signals and/or power to and/or from the valves.

Figure 3:
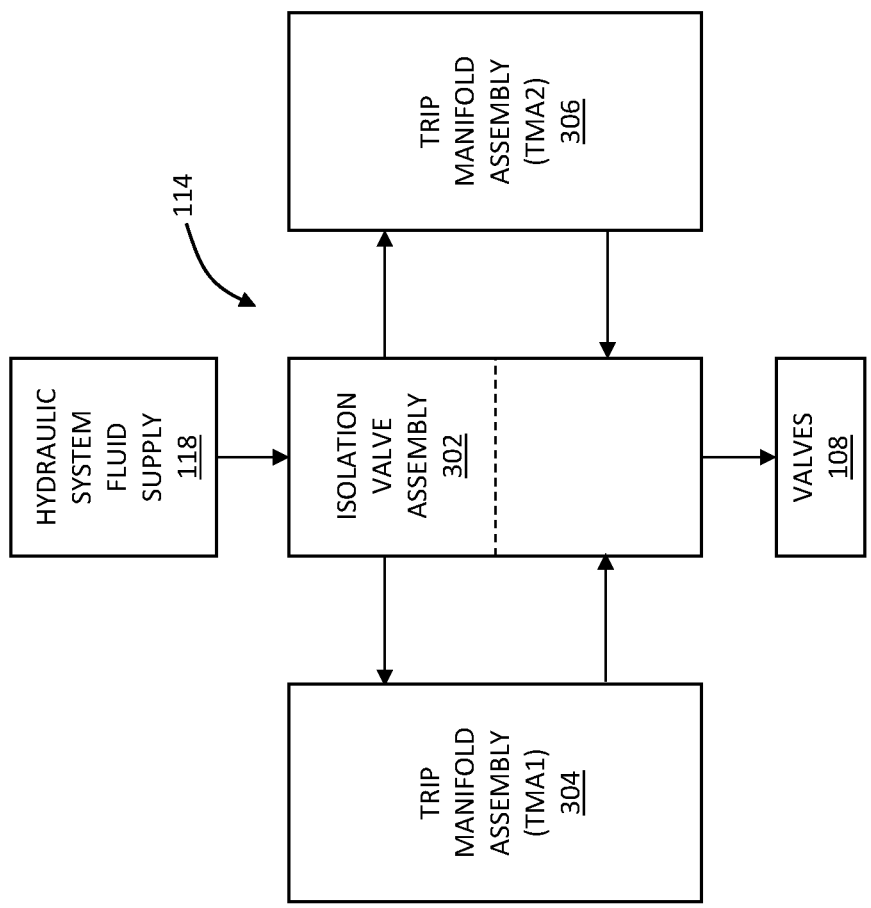
FIG. 3 is a block diagram of a dual trip manifold assembly for use with the steam turbine system shown in FIG. 1.

FIG. 3 is a block diagram of dual TMA 114 for use with steam turbine system 100 (shown in FIG. 1). In the exemplary embodiment, dual TMA 114 includes an isolation valve assembly 302 coupled to a first trip manifold assembly (TMA1) 304 and a second trip manifold assembly (TMA2) 306. TMA1 and TMA2 are coupled together in parallel via isolation valve assembly 302. TMA1 and TMA2 are any type of trip manifold assembly that enables steam turbine system 100 to function as described herein, for example, and without limitation, any electro-hydraulic trip manifold assembly suitable for use with steam turbine system 100. In the exemplary embodiment, TMA1 and TMA2 are identical trip manifold assemblies. TMA1 and TMA2 include parallel arrangements of solenoid valves, hydraulic block valves, instrumented dump valves, relay valves, orifices, filters, check valves, or other similar valves assembled as a single, integrated hydraulic circuit. In the exemplary embodiment, valves 108 are coupled to isolation valve assembly 302. As described herein, valves 108 are actuated and/or positioned via control system 116 (shown in FIG. 1) to facilitate fluid intake by steam turbine 102 (shown in FIG. 1). Dual TMA 114, and more particularly, isolation valve assembly 302, is coupled in fluid communication to a hydraulic system fluid supply 118. Hydraulic system fluid supply 118 operates to supply a pressurized hydraulic fluid to dual TMA 114 to operate dual TMA 114 for actuating valves 108 to shut down or trip steam turbine 102.

Figure 4:
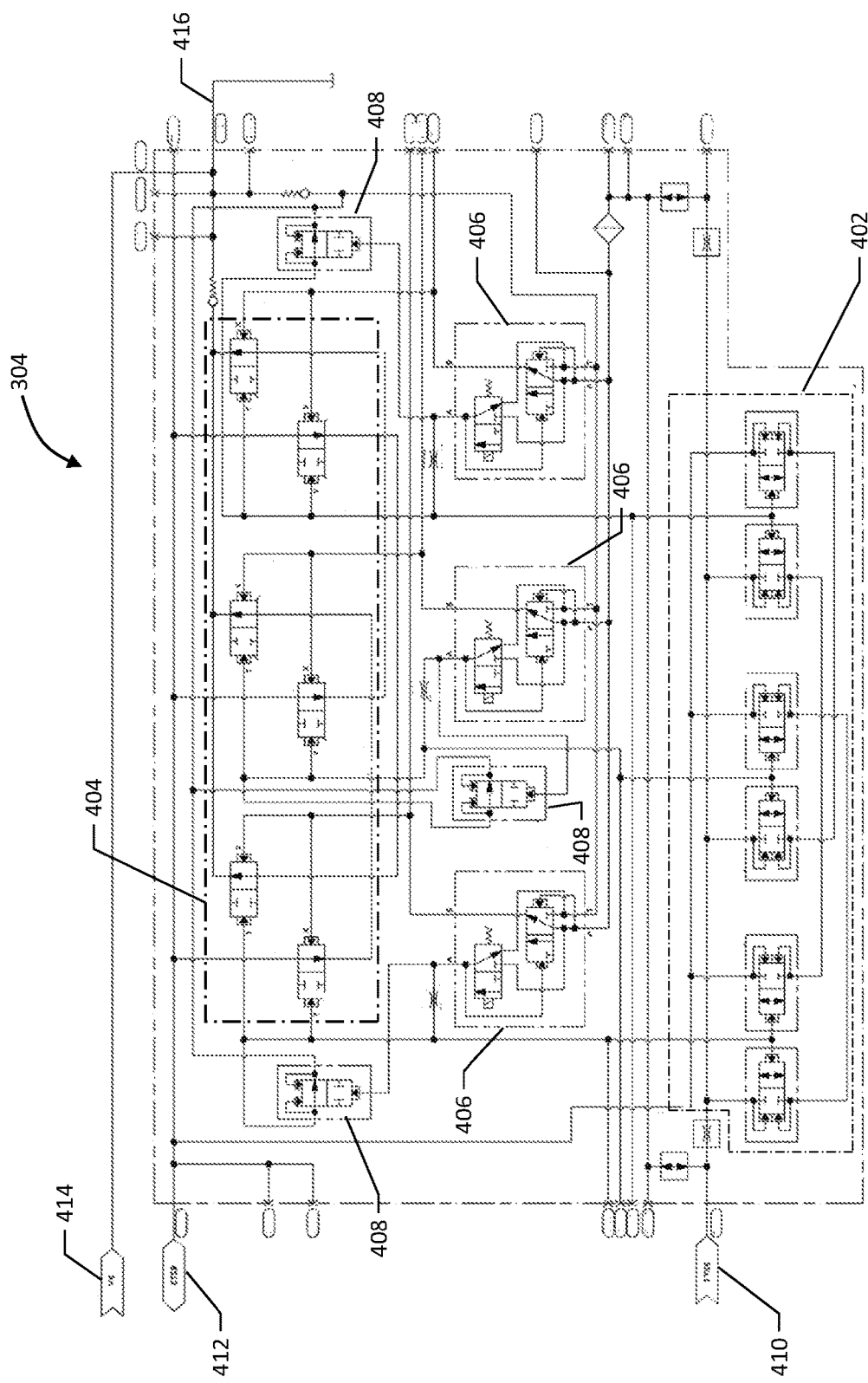
FIG. 4 is a schematic diagram of a trip manifold assembly for use with the dual trip manifold assembly shown in FIG. 3.

FIG. 4 is a schematic diagram of TMA1 304 for use with dual TMA 114 (shown in FIG. 3). As described herein, in the exemplary embodiment, TMA1 and TMA2 are identical, and thus the detailed description of TMA1 304 herein applies equally to TMA2 306. In the exemplary embodiment, TMA1 304 includes three sets of internal block valves 402, three sets of dump valves 404, solenoid valves 406, relay valves 408, fluid supply header 410, trip header 412, and vent port 414 arranged as a single hydraulic circuit. Internal block valves 402, internal dump valves 404, solenoid valves 406, and relay valves 408 are used to depressurize trip header 412 to close valves 108 (shown in FIG. 1), for example, for routine and emergency shut-downs of steam turbine 102.

In the exemplary embodiment, the TMA1 304 includes three parallel fluid flow paths, each fluid flow path including a respective one of the three sets of internal block valves 402 (each set including two valves in series). The parallel sets of block valves 402 receive fluid from fluid supply header 410. The three parallel fluid flow paths are coupled in fluid communication to a drain 416. Each of the three parallel fluid flow paths coupled to drain 416 is controlled by a respective dump valve 404 set (each set of dump valves 404 including two valves in series). Each block valve 402 set is a hydraulically operated valve set for a respective one of the three fluid flow paths extending therefrom.

In the exemplary embodiment, solenoid valves 406 include three poppet-solenoid valves 406 of a dry-pin configuration used to control the hydraulic pilot pressure to open or close one or more of relay valves 408, block valves 402, and/or dump valves 404 as part of the triple modular redundant (TMR) design of TMA1 304. Thus, if one of solenoid valves 406, relay valves 408, block valves 402, and/or dump valves 404 fail or is otherwise inoperable, TMA1 304 continues to operate. In the exemplary embodiment, block valves 402, dump valves 404, and solenoid valves 406 operate according to a "voting" logic (e.g., two-out-of-three) controlled by control system 116 (shown in FIG. 1) to separate two of the three hydraulic fluid flow paths and maintain at least one fluid depressurization path.

In the exemplary embodiment, when solenoid valves 406 are energized, block valves 402 are opened, thereby opening fluid supply header 410, and dump valves 404 are closed to channel the fluid to and pressurize trip header 412. This ensures that a failure of a single solenoid valve 406 does not affect the operability of TMA1 304. When solenoid valves 406 are de-energized, fluid supply header 410 to trip header 412 is blocked, and trip header 412 is depressurized via dump valves 404. Thus, as described herein, a failure of a single solenoid valve 406 does not affect the tripping function of TMA1 304. TMA1 304 continuously provides tripping and/or emergency shutdown functionality even when one of solenoid valves 406 fails or is otherwise inoperable.

In the exemplary embodiment, TMA1 304 operates at a hydraulic pressure in the range between approximately 60 pounds per square inch (psig) and approximately 3000 psig, and preferably, in the range between approximately 60 psig and approximately 2400 psig. TMA1 304 provides a large flow capacity, fast response times (e.g., as compared to non-configurable and/or single-configuration manifolds), and increased tolerance to contamination in steam turbine 102 hydraulic fluid control systems. For example, the arrangement of dump valves 404 and relay valves 408 facilitates a decrease in response time as compared to non-configurable and/or single-configuration manifolds. In addition, TMA1 304 provides for increased fluid flow rates due to an increase in effective flow area provided by TMA1 304 without significantly increasing a physical size of TMA1 304.

Figure 5:
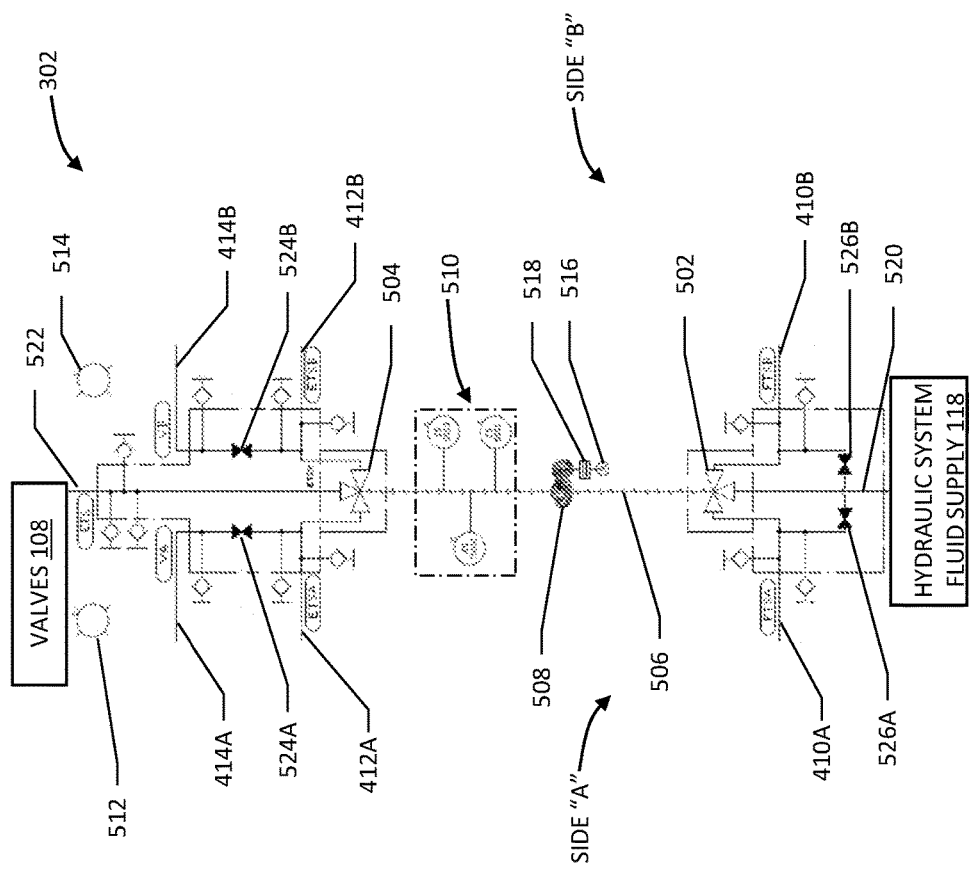
FIG. 5 is a schematic diagram of an isolation valve assembly for use with dual trip manifold assembly shown in FIG. 3.

FIG. 5 is a schematic diagram of isolation valve assembly 302 for use with dual TMA 114 (shown in FIGS. 1 and 3). With reference to FIGS. 1 and 3-5, in the exemplary embodiment, isolation valve assembly 302 is a valve assembly configured to couple to two discrete TMAs, for example, TMA1 304 and TMA2 306. Isolation valve assembly 302 allows for both sides of dual TMA 114 to be in operation to facilitate increased tripping reliability. In addition, isolation valve assembly 302 is configured to isolate either side of isolation valve assembly 302 to facilitate online maintenance of either TMA1 304 or TMA2 306, thus facilitating increasing running reliability of steam turbine 102. For example, and without limitation, online maintenance of TMA1 304 or TMA2 306 can be completed with either of TMA1 304 or TMA2 306 left coupled to isolation valve assembly 302, or with either of TMA1 304 or TMA2 306 completely decoupled and removed from isolation valve assembly 302. In one embodiment, one of TMA1 304 or TMA2 306 is decoupled and removed from isolation valve assembly 302 and replaced with another trip manifold assembly, such as a spare trip manifold assembly. In the exemplary embodiment, because isolation valve assembly 302 is a symmetric valve assembly and TMA1 304 and TMA2 306 are substantially identical, isolation valve assembly 302 will be described with reference to a first side "A" and a second side "B." In addition, fluid supply header 410, trip header 412, and vent port 414 of TMA1 304 and TMA2 306 will include an "A" or "B" designation with regards to FIG. 5, depending on the side of isolation valve assembly 302 to which the components are coupled. In the exemplary embodiment, TMA1 304 will be described as being coupled to side "A" and TMA2 306 will be described as being coupled to side "B" of isolation valve assembly 302.

In the exemplary embodiment, isolation valve assembly 302 includes two three-way ball valves or isolation valves, generally indicated at 502 and 504. Isolation valves 502 and 504 are synchronized to each other via a rotatable shaft 506, such that rotation of one valve causes a substantially similar rotation in the other valve. A gearbox 508 is coupled to rotatable shaft 506 to facilitate turning rotatable shaft 506 to adjust a position of isolation valves 502 and 504 substantially simultaneously. Rotatable shaft 506 includes three position indicators or switches, generally indicated at 510, to facilitate indicating a position, such as a correct position, of isolation valves 502 and 504 during normal operation and during online maintenance of TMA1 304 and TMA2 306. In the exemplary embodiment, isolation valve assembly 302 includes visual indicators, such as LEDs 512 and 514 that illuminate when switches 510 indicate a respective side of isolation valve assembly 302 is in service. For example, in the exemplary embodiment, LED 512 is located on side "A" and is configured to illuminate when side "A" is in service. Similarly, LED 514 is located on side "B" and is configured to illuminate when side "B" is in service. When both sides "A" and "B" are in service, both LEDs 512 and 514 are illuminated. When rotatable shaft 506 is rotated to take one side out of service, both LEDs 512 and 514 are unlit or darkened until one side is completely isolated. When one of sides "A" and "B" is completely isolated, the LED representing the side that remains in service is illuminated.

In the exemplary embodiment, gearbox 508 includes an input device, such as a hand wheel 516 coupled to gearbox 508 via an over-torque protector or clutch mechanism 518. Clutch mechanism 518 is configured to provide over-torque protection to gearbox 508 and isolation valves 502 and 504 by slipping when an input torque, via hand wheel 516, for example, exceeds a predetermined torque value. Clutch mechanism 518 is configured to provide repeatable over-torque protection without sustaining damage to clutch mechanism 518. In addition, in the exemplary embodiment, at least one of isolation valves 502 and 504 include locking mechanism (not shown) configured to lock one of isolation valves 502 and 504 in place, thereby preventing turning of valves 502 and 504. Locking isolation valves 502 and 504 with both TMA1 304 and TMA2 306 in service, or with one of TMA1 304 and TMA2 306 out of service, facilitates preventing an errant shutdown or trip, or causing an inadvertent shutdown or trip, of steam turbine 102. In addition, the locking mechanism facilitates preventing the turning of valves 502 and 504 as may be required by local safety procedures to prevent injuries and/or to prevent a discharge of high pressure fluids.

Hydraulic system fluid supply 118 is coupled to an input supply line 520, which is coupled to isolation valve 502. Depending on the orientation of isolation valve 502, a fluid is channeled to one or more of fluid supply headers 410A and 410B of TMA1 304 and TMA2 306, respectively. As described herein, when solenoid valves 406 of TMA1 304 and TMA2 306 are energized, block valves 402 are opened, thereby opening fluid supply headers 410A and 410B, and dump valves 404 are closed to channel the fluid to and pressurize trip headers 412A and 412B of TMA1 304 and TMA2 306, respectively. The fluid flows through isolation valve 504 and is channeled to valves 108 via turbine trip header 522 to control the fluid flow (not shown) to steam turbine 102 (shown in FIG. 1).

When isolation valves 502 and 504 are turned to isolate one side of isolation valve assembly 302, for example, side "A," the fluid pressure at fluid supply header 410A is removed. At least a portion of the fluid and any residual pressure in TMA1 304 is released via drain 416 by opening dump valves 404 and/or vent port 414A via vent port valve 524A. Similarly, side "B" includes vent port 414B that is opened/closed via a vent port valve 524B. In such a configuration of isolation valve assembly 302, TMA1 304 is off-line and can be removed from dual TMA 114, tested, maintained, or repaired, while TMA2 306 remains online to maintain protection of steam turbine 102. This enables steam turbine 102 to remain in service during maintenance of one of TMA1 304 and TMA2 306, thereby facilitating increasing the availability of steam turbine 102.

To return TMA1 304 to service, the fluid pressure in TMA1 304 is increased to substantially the same fluid pressure as that in TMA2 306. In the exemplary embodiment, with side "A" of isolation valve assembly 302 isolated, pressurization valves 526A and 526B are manually opened to facilitate increasing the fluid pressure in TMA1 304 by channeling pressurized fluid from one side of isolation valve assembly 302 to the other. This enables fluid that is under pressure in TMA2 306 to flow to TMA1 304. To facilitate removing air from the hydraulic circuit of TMA1 304, vent port valve 524A is opened. When the air is expelled from TMA1 304, vent port valve 524A is closed, thereby enabling the fluid pressure in TMA1 304 to build to substantially the same fluid pressure as in TMA2 306. Isolation valves 502 and 504 are turned to bring side "A" of isolation valve assembly 302 back into service, and pressurization valves 526A and 526B are closed.

One advantage of dual TMA 114 is that isolation valve assembly 302 facilitates online maintenance of all components of TMA1 304 and TMA2 306, maintenance of vent port valves 524A and 524B, and maintenance of pressurization valves 526A and 526B. This facilitates providing an emergency overspeed protection system that is Triple Modular Redundant, online-maintainable, and single point fault tolerant (even during online maintenance mode) so latent component failures do not leave steam turbine 102 (shown in FIG. 1) unprotected. In addition, an advantage of dual TMA 114 is that TMA1 304 and TMA2 306 can be isolated and/or removed from service during operation of steam turbine 102, and are online testable in order to identify component failures before they can accumulate and leave steam turbine 102 unprotected or cause it to shut down.

In contrast to known emergency overspeed protection systems (EOPS), the dual TMA system described herein provides a triple modular redundant (TMR), fault tolerant, online-testable, online-maintainable, electro-mechanical-hydraulic assembly that functions as an interface between a turbine control system and hydraulically-powered final control components (e.g., stop, control, intercept, and/or reheat stop valves) of the turbine control and an emergency shutdown system, wherein one of the trip manifold assemblies (TMAs) can be isolated and removed from the system during operation of the turbine. Specifically, the dual TMA system includes two parallel TMAs coupled to an isolation valve assembly. Therefore, in contrast to known EOPS, the dual TMA described herein facilitates increased turbine tripping and running reliability. In addition, the isolation valve assembly provides for both sides of the dual TMA to be in operation for increased tripping reliability. The dual TMA further provides for either side to be isolated and removed from the system, or isolated from the system to perform online maintenance to the isolated TMA, thereby providing for pressurizing and testing the isolated TMA while the turbine system is online.

An exemplary technical effect of the dual TMA described herein includes at least one of: (a) an interface between a turbine control system and hydraulically powered final control components of the turbine control and emergency shutdown system; (b) a contamination resistant and fault tolerant system that provides a triple modular redundant (TMR) design; (c) providing a parallel, redundant dual TMA system having an isolation valve assembly; (d) isolating and/or removing one of the parallel, redundant dual TMAs from the EOPS; (e) removing, maintaining, repairing, and/or the isolated TMA while the turbine system remains online; and (f) testing and returning the isolated TMA to service while maintaining the turbine system online.

Exemplary embodiments of an apparatus and systems for emergency overspeed protection systems are described above in detail. The apparatus and systems described herein are not limited to the specific embodiments described, but rather, components of apparatus and systems may be utilized independently and separately from other components described herein. For example, and without limitation, the apparatus and systems may also be used in combination with other turbine systems, and are not limited to practice with only the apparatus and systems described herein. Rather, the exemplary embodiments can be implemented and utilized in connection with many turbine protection system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An emergency overspeed protection system comprising:
    at least one trip manifold assembly (TMA) comprising a fluid supply header and a trip header coupled in flow communication to said fluid supply header; and
    an isolation valve assembly comprising:
        a first valve configured to receive a flow of fluid from a hydraulic system fluid supply, said first valve coupled in flow communication to said fluid supply header; and
        a second valve coupled in flow communication to said trip header, said second valve configured to receive the flow of fluid from said trip header,
    wherein said first valve and said second valve are coupled to each other such that closing said first valve with respect to said at least one TMA causes said second valve to close with respect to said at least one TMA, thereby isolating said at least one TMA from the flow of fluid.

2. An emergency overspeed protection system in accordance with claim 1, wherein said isolation valve assembly further comprises a plurality of vent port valves configured to release fluid pressure in at least a portion of said isolation valve assembly.

3. An emergency overspeed protection system in accordance with claim 1, wherein said isolation valve assembly further comprises a plurality of pressurization valves configured to channel pressurized fluid from one side of said isolation valve assembly to the other.

4. An emergency overspeed protection system in accordance with claim 1, wherein said isolation valve assembly further comprises a rotatable shaft coupled to said first valve and said second valve.

5. An emergency overspeed protection system in accordance with claim 4, wherein said isolation valve assembly further comprises a plurality of position switches coupled to said rotatable shaft, said plurality of position switches configured to indicate a position of said first valve and said second valve.

6. An emergency overspeed protection system in accordance with claim 4, wherein said isolation valve assembly further comprises a plurality of visual indicators, said plurality of visual indicators configured to present a visual indication of the position of said first valve and said second valve based on the position indication of said plurality of position switches.

7. An emergency overspeed protection system in accordance with claim 4, wherein said isolation valve assembly further comprises a gearbox coupled to said rotatable shaft, said gearbox configured to rotate said rotatable shaft to adjust a position of said first valve and said second valve.

8. An emergency overspeed protection system in accordance with claim 7, wherein said isolation valve assembly further comprises an over-torque protector coupled to said gearbox, said over-torque protector configured to provide over-torque protection to said gearbox when an input torque exceeds a predetermined torque value.

9. An emergency overspeed protection system in accordance with claim 8, wherein said over-torque protector is configured to slip when the input torque exceeds the predetermined torque value.

10. An emergency overspeed protection system in accordance with claim 8, wherein said over-torque protector is configured to provide repeatable over-torque protection without sustaining damage to said over-torque protector.

11. An emergency overspeed protection system in accordance with claim 1 further comprising at least one of a turbine system and an electrical generator communicatively coupled to said isolation valve assembly.

\* \* \* \* \*